(12) United States Patent
Harris et al.

(10) Patent No.: US 7,764,644 B2
(45) Date of Patent: Jul. 27, 2010

(54) METHOD AND APPARATUS FOR REDUCING OVERHEAD FOR SIGNALING

(75) Inventors: John M. Harris, Glenview, IL (US);
Philip J. Fleming, Glen Ellyn, IL (US);
Sean M. McBeath, Keller, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/872,179

(22) Filed: Oct. 15, 2007

(65) Prior Publication Data

US 2008/0101281 A1   May 1, 2008

Related U.S. Application Data

(60) Provisional application No. 60/863,214, filed on Oct. 27, 2006.

(51) Int. Cl.
*H04W 4/00* (2009.01)
*H04J 3/24* (2006.01)

(52) U.S. Cl. .................... 370/328; 370/349; 370/338

(58) Field of Classification Search ................ 370/432, 370/252, 329, 219, 349, 338, 328, 342, 229, 370/468; 455/450; 379/219; 375/368
See application file for complete search history.

(56) References Cited

U.S. PATENT DOCUMENTS 5,910,981 A * 6/1999 Bhagat et al. ............... 379/219
6,839,392 B1 * 1/2005 Bagheri et al. .............. 375/368
6,973,030 B2 * 12/2005 Pecen et al. ................. 370/229
2006/0176882 A1 * 8/2006 Schein et al. ............ 370/395.32
2006/0264218 A1 * 11/2006 Zhang et al. ................ 455/450
2007/0104135 A1 * 5/2007 Pecen et al. ................. 370/329
2007/0104136 A1 * 5/2007 Pecen et al. ................. 370/329

OTHER PUBLICATIONS

WIPO, ISA/US, "PCT International Search Report and Written Opinion," Aug. 6, 2008.

* cited by examiner

*Primary Examiner*—Charles N Appiah
*Assistant Examiner*—Kiet Doan (57) ABSTRACT

A method and apparatus for reducing overhead for signaling where the method includes sending a user bit map field (802) for initiating assignment of users to resources corresponding to bit positions in a resource bit map field (804), and sending the resource bit map field wherein the resource bit map field is a message indicating which resources are assigned to mobile stations. The method and apparatus include sending an indicator bit (808) wherein the indicator bit indicates one of a portion of the user bit map field is being used for purposes other than initiating assignment of users to resources corresponding to bit positions in a resource bit map field and a portion of the resource bit map field is being used purposes other than indicating which resources are assigned to mobile stations (101).

17 Claims, 8 Drawing Sheets

METHOD AND APPARATUS FOR REDUCING OVERHEAD FOR SIGNALING

FIELD OF THE INVENTION

The present invention relates generally to reducing overhead for signaling and, in particular for reducing control overhead for Voice over Internet Protocol signaling within Orthogonal Frequency Division Multiplexing.

BACKGROUND

Wireless communication systems, for example packet based communication systems, may provide voice telephony using Voice-over-Internet-Protocol (VoIP). Any historical demarcation between "data" and "voice" has become blurred in packet based communication systems such that the term "data" usually signifies payload information for any service, whether voice or data, such as may be provided by downloading from the Internet. Differences remain however in that voice will generally employ smaller packet sizes, for example, due to delay sensitivity than would traditional so-called data. A non-voice packet may be larger than a kilo-byte while a voice packet may be only approximately 15-50 bytes. Because the smaller packet sized utilized by voice session, a greatly increased number of voice users may be served thereby placing a burden on the control mechanisms and resources of the communication system.

Systems that employ Hybrid Automatic Repeat Request (HARQ) may make use of persistent channels for retransmissions. Persistent channels eliminate the need for mobile station to decode control channel information for each HARQ retransmission, thereby reducing control channel information for each HARQ retransmission, thereby reducing control channel overhead. To make efficient use of the resources of the communication system, however, it is necessary to reassign the persistent channel for one mobile station, once the packet is acknowledged, which requires additional overhead.

In order to assisting in providing mobile stations with resources for HARQ retransmissions with persistent assignments but without significantly increasing the overhead of the communication system, the prior art uses a sequence of super frames that generally comprise a number of super frames within each super frame comprise a number of frames. The frames within each super frame may have a resource assignment control channel portion within a control channel portion and a data channel portion. Two frames can be grouped together to form a long frame. An interlace pattern is defined as a sequence of regularly distanced long frames. For systems employing synchronous hybrid automatic repeat request (S-HARQ), the initial and subsequent retransmission typically occur in the same interlace patter.

For orthogonal frequency division multiple access (OFDMA) systems, a forward link VoIP bit map approach also applies to a reverse link. The frames have a bit map frame and a physical channel frame. The bit map frames indicate which terminals are receiving resources in the physical channels and can assign which of the physical channels to a given terminal. In one embodiment of the prior art, resources are pre-assigned to terminals and the bit map simply indicates the presence of a resource in use. Thus, each terminal in the bit map is associated with a given location in the bit map, and each location within the bitmap is associated with a unique predefined radio resource. Thus, for example, when a "1" is designated in a location within the bit map, the terminal knows that a resource is provided on the physical channel associated for that terminal. In this embodiment, typically, there is a one-to-one association between the user bit map and the physical channel, referred to as the resource bit map, such that the first position in the bit map aligns with the first physical channel in the resource bit map, the second position in the bit map aligns with the second physical channel in the resource bit map and the nth position in the bit map aligns with the nth physical channel in the resource bit map.

In another embodiment, resources are not pre-assigned to terminals, but rather, assigned to terminals with their bit locations set to "1" in a round-robin or some other pre-specified order. Each terminal is associated with a location within a bit map, and the nth assigned terminal corresponds to the nth radio resource. When a "1" is designated in the location within the bit map for a given terminal, the terminal knows that a resource is provided in the physical channel such that the terminal is the nth assigned terminal the nth physical channel is assigned to that terminal. For example, the terminal assigned to bit map position determines that a physical channel includes resources for that terminal, the terminal determines that how many other terminals have previously been assigned a physical channel and the next physical channel is assigned to that terminal. Thus, a terminal assigned to bit map position 10 detects a "1" in that location determines that 5 other terminals in bit map positions 1-9 have been assigned physical channels knows that the sixth physical channel is assigned to that terminal.

In another embodiment, the bit map is divided into two sections. The first section is for a subgroup of terminal that receives an indication of which terminals in the group are beginning new transmissions. Other subgroups are not represented in the bitmap, except through the first section of the bitmap which indicates which previously-signaled transmissions to them are ongoing. A control channel bit map can be divided into two sections where the first section contains one bit per channel and the second section contains one bit per wireless terminal for which a first HARQ transmission is intended. Only wireless terminals for which a first transmission is intended are indicated in the bit map. The nth active wireless terminal for which a transmission is intended ("1" in the second section of the bit map) is assigned the nth resource not indicated as active in the first section of the bit map. This resource is a persistent assignment, meaning the terminal does not need to decode the control channel again until its next first transmission opportunity. Thus, an assigned terminal in the user bit map gets the next available resource in the resource bit map. In an embodiment, the user bit map indicates to a user that it is to be assigned a new physical channel in the resource bit map. In response, the terminal is assigned the first available resource in the resource bit map. Accordingly, the beginning, or fore, portion of the resource bit map is used before the end, or aft, portion of the bit map. According, the aft portion of the resource bit map is not used.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method and apparatus for reducing control overhead for a Voice over Internet Protocol (VoIP) signaling. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for reducing control overhead for VoIP signaling described herein. The non-processor circuits may include, but are not limited to, a radio receiver, a radio transmitter, signal drivers, clock circuits, power source circuits, and user input devices. As such, these functions may be interpreted as steps of a method for reducing control overhead for VoIP signaling. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is direct to a method that includes sending a user bit map field for assigning bits in a resource bit map field wherein the user bit map field includes an indicator bit. The method also includes sending the resource bit map field wherein the resource bit map field is a message containing data for mobile stations and wherein the indicator bit indicates a portion of the resource bit field being used for additional data for at least one of the mobile stations. The user bit map field may include a data field indicating a size of the resource bit field being used for additional data for the mobile stations. In addition, the resource bit map field may be used for at least one of among a user start bit indicator to the at least one of the mobile stations, a resource assignment retransmission for the at least one of the mobile stations, a control signaling indicating group membership change for the at least one of the mobile stations, a data packet format start indication, a data packet format inclusion indicator, a retransmission including indicator, a new data indicator, modulation coding scheme of a packet, a data packet format start indication, a data packet format inclusion indicator, a retransmission inclusion indicator, a repacking bit, and an indicator as to the inclusion of a subsequent optional field within the resource bit field.

The indicator bit may indicate that the resource bit map field is being used for additional data for at least one of the mobile stations when a first threshold number of bits in the user bit map field are zero. The indicator bit may also indicate that the resource bit map field is being used for additional data for at least one of the mobile stations when a second threshold number of bits in the resource bit field are zero.

In another embodiment of the invention, a bit map scheme is provided where the bit map includes a user bit map field and a resource bit map field. The user bit map field comprising at least one bit to indicate that at least one bit of the resource bit map includes additional data for at least one mobile station. The bit map scheme may be used for an orthogonal frequency division multiple access system. The indicator may be used as a user bit position when the user bit field is heavily loaded. And the indicator may use a message format when a threshold load is reached for the user bit map field.

In yet another embodiment, the present invention includes sending a user bit map field for initiating assignment of users to resources corresponding to bit positions in a resource bit map field and sending the resource bit map field wherein the resource bit map field is a message indicating which resources are assigned to mobile stations. In addition, the present invention includes sending an indicator bit wherein the indicator bit indicates one of a portion of the user bit map field is being used for purposes other than initiating assignment of users to resources corresponding to bit positions in a resource bit map field and a portion of the resource bit map field is being used purposes other than indicating which resources are assigned to mobile stations.

Figure 1:
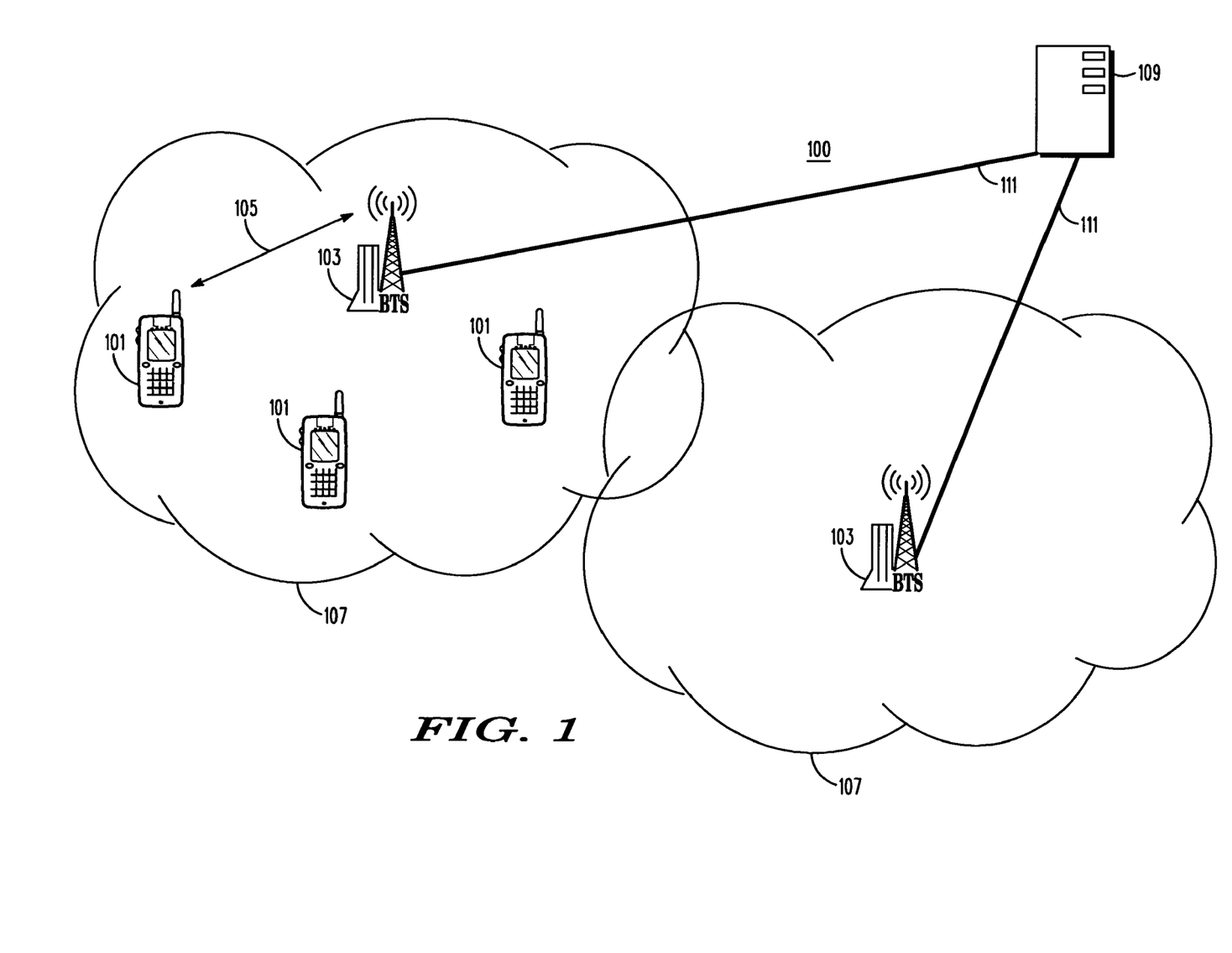
FIG. 1 is block diagram of a wireless communication network used in accordance with some embodiments of the invention.

Turning to FIG. 1, a communication network 100 is illustrated with various base stations 103, each base station 103 having a corresponding coverage area 107. In general, base station coverage areas may overlap and form an overall network coverage area. The base stations 103 may be referred to by other names such as base transceiver station, Node B, and access node depending on the wireless technology being used in the network 100. A network coverage area may comprise a number of base station coverage areas 108, which may form a contiguous radio coverage area. It is not required, however, to have contiguous radio coverage and therefore a network coverage area may alternatively be distributed.

Furthermore, each coverage area may have a number of mobile stations 101. Mobile stations may also be referred to as access terminals (ATs), user equipment (UEs), or other terminology depending on the wireless technology being used by the network 100. A number of base stations 103 will be connected to a base station controller 109 via backhaul connections 111. The base station controller 109 and base stations form a Radio Access network (RAN). The overall network may comprise any number of base station controllers, each controlling a number of base stations. Note that the base station controller 10 may alternatively be implemented as a distributed function among the base stations 103. Regardless of specific implementations, the base station controller 109 comprises various modules for packetized communications such as a packet scheduler, packet segmentation and reassembly, etc., and modules for assigning appropriate radio resources to the various mobile stations 101.

The base stations 103 may communicate with the mobile station 1010 via any number of standard air interfaces and using any number of modulation and coding schemes. For example, Universal Mobile Telecommunications System (UMTS), Evolved UMTS (E-UMTS) Terrestrial Radio Access (E-UTRA) or CDMA 2000 may be employed. Further, E-UMTS may employ Orthogonal Frequency Division Multiplexing (OFDM) and CDMA2000 may employ orthogonal spreading codes such as the Walsh codes. Semi-orthogonal spreading codes may also be utilized to achieve additional channelization over the air interface. Further the network may be an Evolved High Rate Packet Data (E-HRPD) network. Any appropriate radio interface may be employed by the various embodiments.

Figure 2:
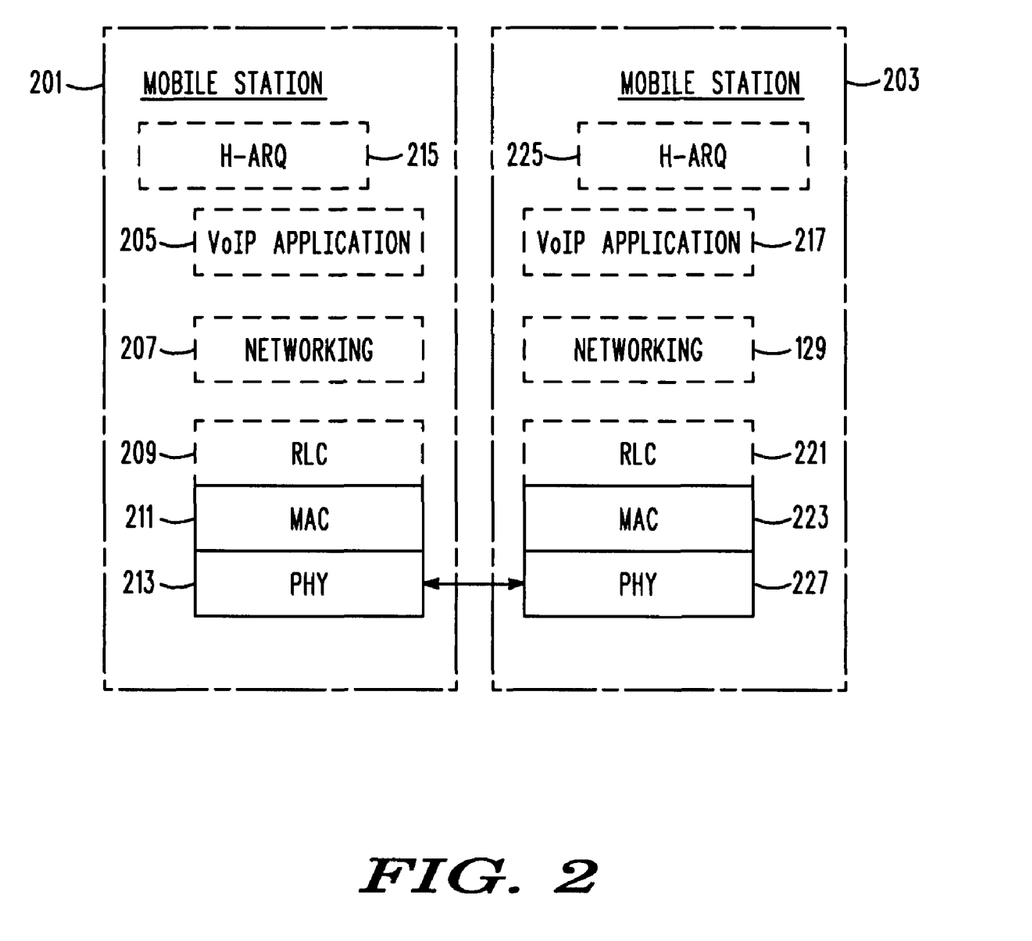
FIG. 2 is a block diagram of a mobile station and base station architecture used in accordance with embodiments of the present invention.

In FIG. 2, a mobile station 201 and base station 203 architectures in accordance with the various embodiments are illustrated. Mobile station 201 comprises a stack having a VoIP application 205, a networking layer 207, a Radio Link Controller (RLC) 209, a Medium Access Controller (MAC) 211, and a Physical Layer (PHY) 213. In addition, mobile station 201 has HARQ component 215, which may be separate or may be integrated into any of the other components/layers. The mobile station 201 HARQ component 215 may receive a utilized resources field and/or a first HARQ transmission assignments field for determining its resource allocations for transmitting or receiving data. The mobile station may transmit request messages to the base station on the physical layer.

The base station 203 similarly has a VoIP application 217, a networking layer 219, a RLC 221, MAC 223 and PHY 227. However, base station 203 additionally has in the various embodiments HARQ scheduling component 225. The base station 203 HARQ scheduling component 225 may send a reserved blocks field and/or a first HARQ transmission assignments field to groups and/or subgroups of mobile stations for indicating their resource allocations for transmitting or receiving data. Further, the HARQ scheduling component 225 may define the HARQ subgroups in some embodiments.

Figure 3:
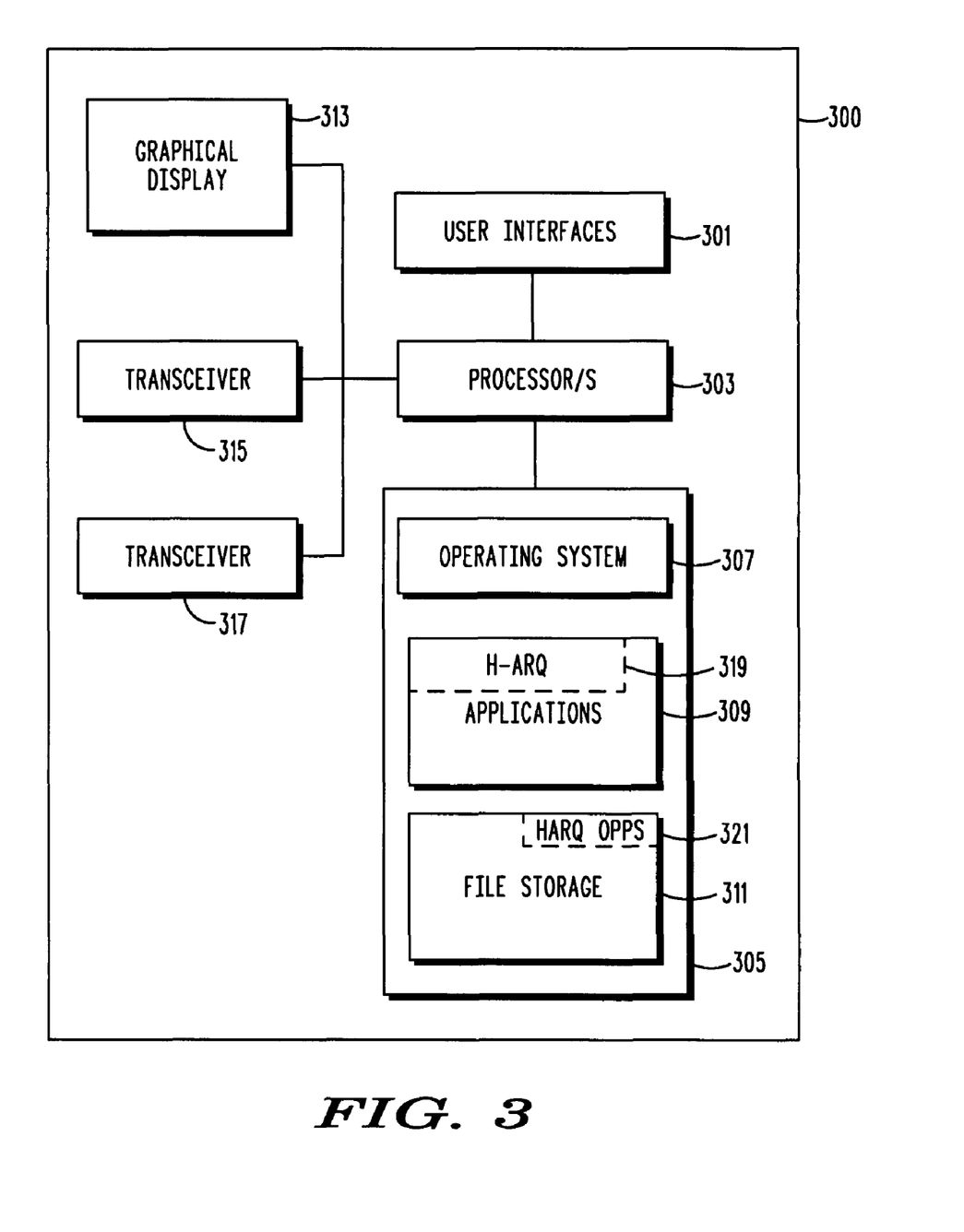
FIG. 3 is a block diagram of a mobile station used in accordance with some embodiments of present invention.

FIG. 3 is a block diagram illustrating the primary components of a mobile station in accordance with some embodiments of the present invention. Mobile station 300 comprises user interfaces 301, at least one processor 303, and at least one memory 305. Memory 305 has storage sufficient for the mobile station operating system 307, applications 309 and general file storage 311. Mobile station 300 user interfaces 301, may be a combination of user interfaces including but not limited to a keypad, touch screen, voice activated command input, and gyroscopic cursor controls. Mobile station 300 has a graphical display 313, which may also have a dedicated processor and/or memory, drivers etc. which are not shown in FIG. 3.

It is to be understood that FIG. 3 is for illustrative purposes only and is for illustrating the main components of a mobile station in accordance with the present disclosure, and is not intended to be a complete schematic diagram of the various components and connections there between required for a mobile station. Therefore, a mobile station may comprise various other components not shown in FIG. 3 and still be within the scope of the present disclosure.

Returning to FIG. 3, the mobile station 300 may also comprise a number of transceivers such as transceivers 315 and 317. Transceivers 315 and 317 may be for communicating with various wireless networks using various standards such as, but not limited to, UMTS, E-UMTS, E-HRPD, CDMA2000, 802.11, 802.16, etc.

Memory 305 is for illustrative purposes only and may be configured in a variety of ways and still remain within the scope of the present disclosure. For example, memory 305 may be comprised of several elements each coupled to the processor 303. Further, separate processors and memory elements may be dedicated to specific tasks such as rendering graphical images upon a graphical display. In any case, the memory 305 will have at least the functions of providing storage for an operating system 307, applications 309 and general file storage 311 for mobile station 300. Applications 309 may comprise a software stack that communicates with a stack in the base station. Therefore, applications 309 may comprise HARQ component 319 for providing the capabilities of using the HARQ scheduling information received from a base station as was described in detail above. File storage 311 may provide storage for an HARQ OPPS allocation, as illustrated by FIG. 3.

Figure 4:
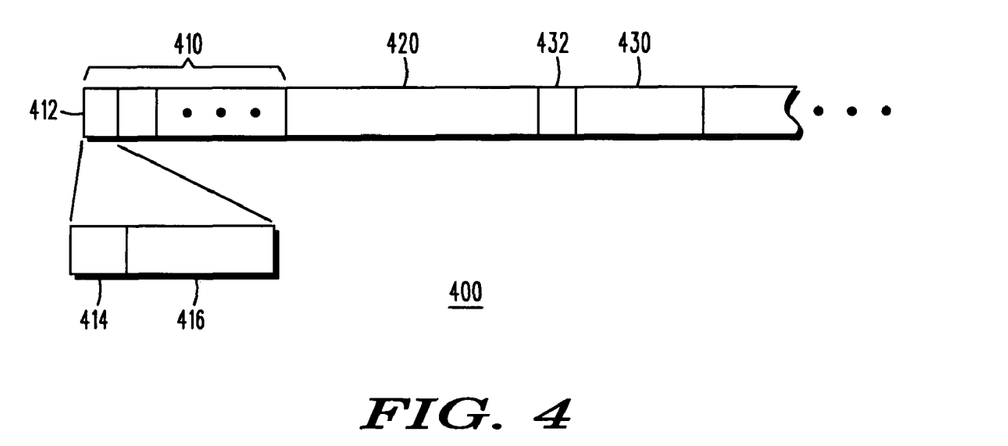
FIG. 4 is block diagram of a sequence of super frames each comprising several frames in accordance with some embodiments of the present invention.

FIG. 4 illustrates a sequence of super frames 400 useful for communicating in the wireless communication systems of the various embodiments. In FIG. 4, the super frame sequence generally comprises a number of super frames 410, 420, 430, etc., wherein each super frame comprises a number of frames. For example, super frame 410 comprises a frame 412 having a resource assignment control channel portion within a control channel portion 414 and a data channel portion 416.

For orthogonal frequency division multiple access (OFDMA) systems, the frequency domain is divided into subcarriers. For example, a 5 MHz OFDMA carrier may be divided into 480 subcarriers, with a subcarrier spacing of 9.6 kHz. An OFDMA frame may be divided into multiple OFDM symbols. For example, a frame may occupy 0.91144 msec and contain 8 OFDM symbols, where each symbol occupies approximately 113.93 μsec. The subcarriers are grouped to form block resource channels (BRCH) and distributed resource channels (DRCH). A BRCH is a group of contiguous subcarriers that may hop within a larger bandwidth, while a DRCH is a group of noncontiguous sub-carriers.

In the various embodiments, the base station controller 109, the base stations 103, or some other network infrastructure component group's mobile stations 101 into one or more groups for scheduling purposes. The mobile stations 101 may be grouped based on radio channel conditions associated with the mobile stations, for example, channel quality information reported by the mobile stations, Doppler reported by the mobile stations, distance from the serving cell, etc. Alternatively, or additionally, the mobile stations 101 may be grouped based on one or more mobile station operating characteristics other than participation in a common communication session. Some mobile station operating characteristics include power headroom of the mobile stations, macro diversity considerations, mobile station capability, service of the mobile station, codec rate, etc. Further, mobile stations with an active VoIP session may be grouped together. A mobile station may be a member of more than one group to facilitate handoffs between cells, for improving coverage, or other purposes.

After the group of mobile stations has been determined, the base station 103 sends an indication to the mobile stations 101 of each mobile station's position in the group and an indication of the group identifier. A control channel may be used to send the indications. The base station 103 may use the group identifier to send control information valid for the entire group. For example, the base station 103 may change the frequency allocation for the group by sending an indication of the group identifier and an indication of the new frequency allocation. The position indications may be sent to each mobile station separately or may be sent to several mobile stations at once.

For example, the base station 103 may send a list of wireless mobile station unique identifiers along with a group identifier. Any appropriate rule may be used to determine the position indication, for example, the first mobile station in the list of unique identifiers may be assigned the first position, the second mobile station in the list of unique identifiers may assigned the second position, etc. The mobile station unique identifier may be an Electronic Serial Number (ESN), a subscriber hardware identifier, a Medium Access Control Identifier (MAC-Id), or any other suitable identifier that uniquely identifies a particular mobile station.

Figure 5:
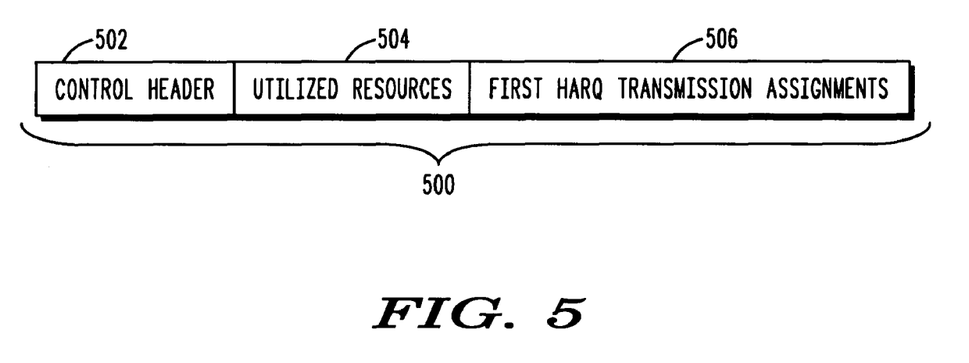
FIG. 5 is a block diagram of bitmaps sent in a shared control channel for resource assignment purposes.

FIG. 5 illustrates how resource assignments may be indicated to mobile stations 101. In FIG. 5, message 500 comprises a first message field, control header 502, which indicates control information relating to the shared resources or control information relating to the users within a group. A second message field, utilized resources 504, indicates which of the set of shared resources are being used, that is currently in use. A third message field, first HARQ transmission assignments 506, is used to allocate persistent resources.

Figure 6:
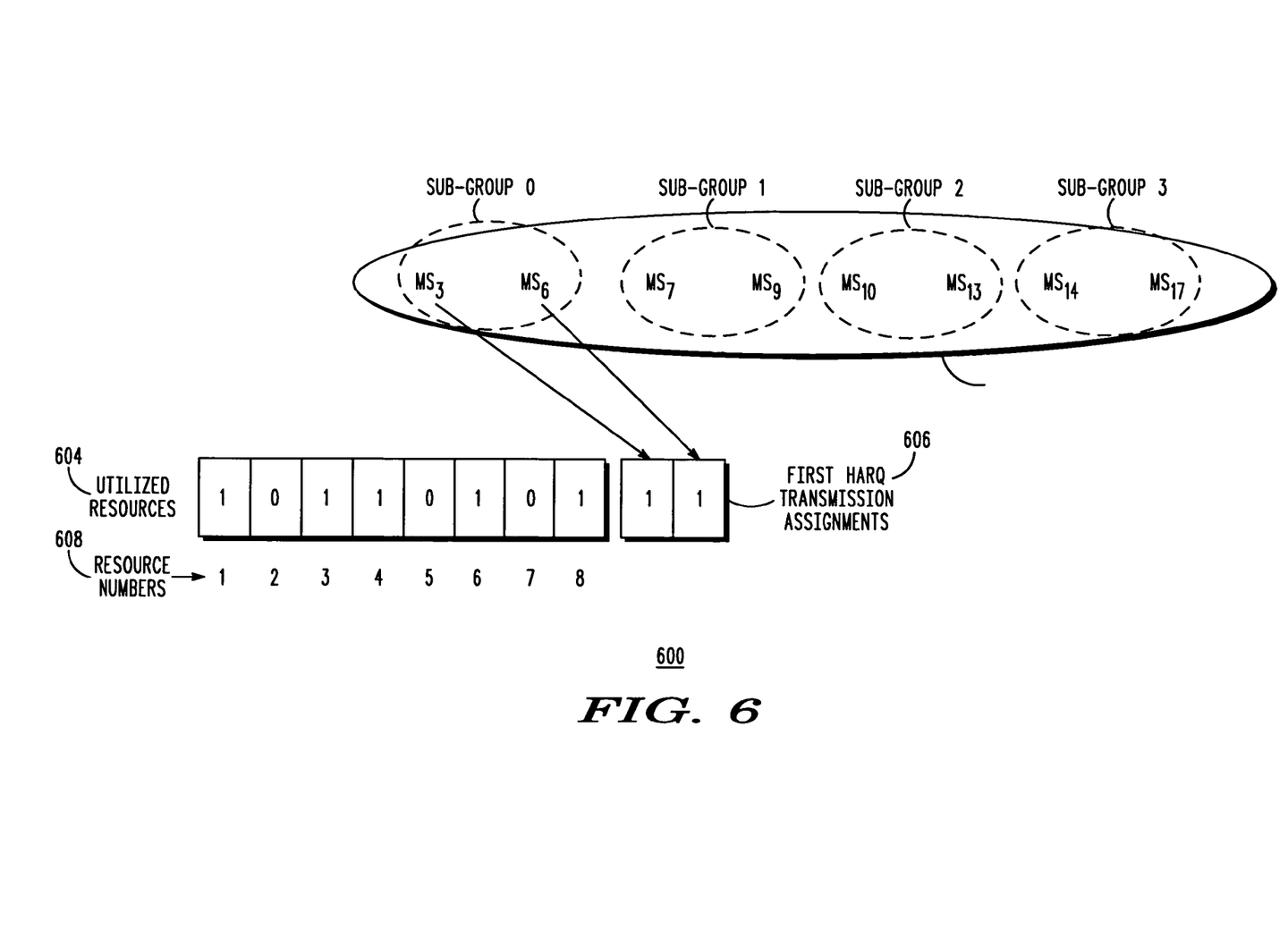
FIG. 6 is a diagram of resource allocation and ordering pattern in accordance with various embodiments.

FIG. 6 illustrates allocation policies having the utilized resource field 504 and the first HARQ transmission assignment field 506. Eight mobile stations are assigned to the group 602 and are assigned group positions 1 through 8. Mobile station 3 ($MS_3$) is assigned group position 1, $MS_6$ is assigned group position 2, $MS_7$ is assigned group position 3, $MS_9$ is assigned group position 4, $MS_{10}$ is assigned group position 5, $MS_{11}$ is assigned group position 6, $MS_{14}$ is assigned group position 7 and $MS_{17}$ is assigned group position 8. Group positions 1 and 2 are assigned to subgroup 0, group positions 3 and 4 are assigned to subgroup 1, group positions 5 and 6 are assigned to subgroup 2 and group positions 7 and 9 are assigned to subgroup 3. The base station 103 transmits to group 602 an indication of the set of shared resources and an assigned ordering pattern indicating the order in which the resources are allocated. This information may be transmitted from the base station 103 to the mobile stations 101 on a control channel.

The base station transmits the utilized resources field 604 and the first HARQ transmission field 606 as part of the shared control channel. The utilized resources field may be of a length 8 bit map, where each bit map position corresponds to one of the shared resources. In particular, the first user bit map position corresponds to the first shared resource, the second bit map position corresponds to the second shared resource, etc. A "1" in the utilized resource field 604 indicates that the corresponding resource in the set of shared resources is currently being used for an ongoing transmission, while a "0" in the utilized resource field 604 indicates resource in the set of shared resources is currently not being used for an ongoing transmission, and is therefore available for a first transmission. In other words, a "0" indicates that those resources are free and can be used for other purposes. Based on the utilized resources field, the mobile stations 101 in the group determine which resources are being used for ongoing transmissions. The first HARQ transmission assignments field 306 is a length of 2 bit map, however each bitmap position corresponds to a mobile station 101 for which a first HARQ transmission opportunity is defined. In this example, a "1" in the first HARQ transmission assignment field 606 indicates that the corresponding mobile station is allocated one of the set of shared resources, while a "0" in the first HARQ transmission assignments field 606 indicates that the corresponding mobile station is not assigned one of the set of shared resources. This first bit map position of the first HARQ transmission assignments field 606 is associated with the first mobile station in the subgroup, while the second bit map position is associated with the second mobile station in the subgroup. The mobile station corresponding to the nth "1" in the first HARQ transmission assignment field is allocated the nth unused resources as defined by the utilized resource field.

The base station will encode and send the utilized resources field 604 and the first HARQ transmission assignments field 606 over the shared control channel. The mobile stations receive and decode the shared control channel to determine the mobile station utilized resources field 604 and the first HARQ transmission assignments field 606. For example, based on the long frame number, $MS_3$ and $MS_6$ determine that a first HARQ transmission opportunity is defined for them. Next, $MS_3$ and $MS_6$ determine which of the set of shared resources are currently being used for ongoing transmissions from the utilized resources field 604. Next, based on the first HARQ transmission assignments field 606, $MS_3$ may determine that it is the first mobile station allocated resources from the set of unused resources and that it is allocated one resource. Therefore, $MS_3$ determines its resource allocation. Likewise $MS_6$ may determine that it is the second mobile station allocated resources from the set of unused resources and that it is allocated one resource. $MS_6$ determines that one resource was previously allocated and therefore determines its allocation.

Figure 7:
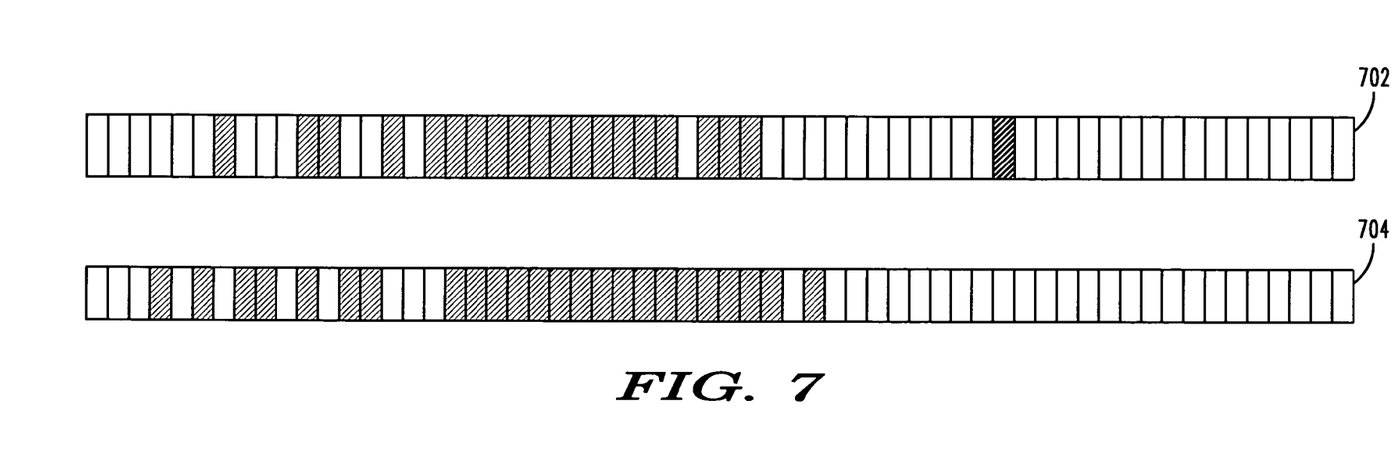
FIG. 7 is a diagram of user bit map and resource bit map fields.

Turning to FIG. 7, a user bit map field 702 and a resource bitmap field 704 is shown. As is discussed above, the user bit map field 702 indicates to the users assigned to each of the bit map positions within the field which users are receiving new data or retransmissions in the resource bit map field 704. In the embodiment shown, the user bit map 702 is larger than those shown in other figures and can have, as shown, 60 bits serving 60 different users. As described, a "1" in the bit map position assigned for a mobile station 101 indicates that a first HARQ retransmission is intended. Thus, only mobile stations for which a first transmission is intended are indicated in the user bit map field 702. The nth active mobile station 101 for which a first transmission is intended, indicated by a "1" in the bit map position for that mobile station is assigned the nth resource not indicated as active in the resource bit map 704. For example, bit map locations marked with "1" each indicate to the mobile stations assigned to that position that a first HARQ retransmission is being assigned to that mobile station. The mobile stations determines its assigned location in the resource bit map by knowing which in position the sequence of users that are notified that they are assigned a first HARQ transmission in the user bit map field 702. Thus, the mobile station assigned to bit position 7 in user bit map field 702 is assigned the first available location within the resource bit field 704, which is bit 1, and the mobile station assigned to bit position 11 is assigned the second available location within resource bit field 704, which is bit 2. The mobile station assigned to user bit map position 15, which is the forth mobile station to be notified of its first HARQ retransmission, is assigned bit 5, which is the forth available bit resource bit map 704 as bit position 4 was assigned in another transmission to another mobile station. In this way, the beginning or fore portion of the resource bit map 704 are assigned to mobile stations more frequently, and end or aft portion of the resource bit map 704 is often not assigned to any mobile stations. This may be particularly true when voice is being transmitted as the size of the voice packets are relatively small and therefore do not need to be retransmitted as frequently.

Figure 8:
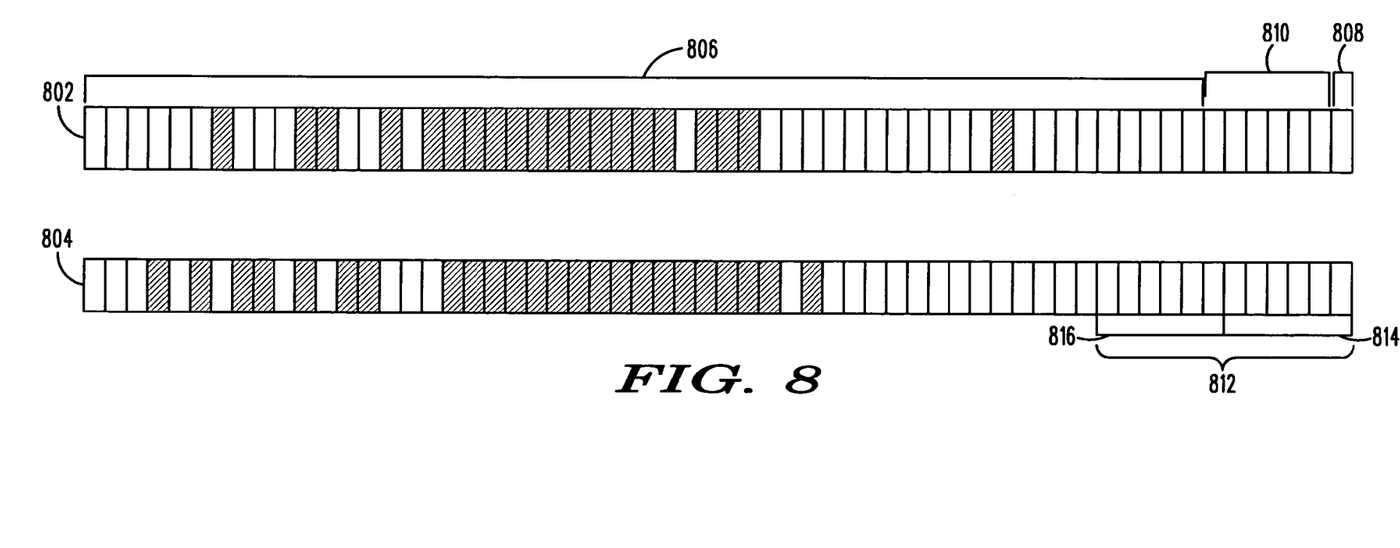
FIG. 8 is a diagram of user bit map field and resource bit map fields of some embodiments of the present invention.

FIG. 8 illustrates bit map fields 800 illustrating an embodiment of the present invention based on the principle that the end or aft portion of the bit map field 704 in not regularly assigned to mobile stations because the beginning portion is assigned first. Bit map fields 800 include a user bit map 802 and a resource bit map 804 which are generally in the form as described above. The user bit map field 802 is divided into a user bit map section 806 and an indicator 808. The indicator 808 can be the last bit location within the user bit map field 802 or any other bit transmitted at the same time as fields 802 and 804. In an embodiment, the user bit map field 802 also includes data field 810. The indicator bit 808 is used to designate to the mobile stations receiving the user bit field that a portion of the resource bit field 804 is being used for additional data to designated users. Such additional data can include data assignment retransmissions. The data field 810 can be used for any number of purposes including designating to mobile stations the size of an additional data field, described below, in the resource bit map 804.

Resource bit map 804 includes an additional data field 812. As seen, additional data field is positioned at the end or aft portion of the resource bit map 804 where resources are not frequently assigned by way of the user bit map 802. In an embodiment, the additional data field 812 can be used to repeat assignment information to mobile stations that may need improved reliability. The additional data field 812 can include at least two portions such as a first additional data field 814 for the additional data that is to be sent to mobile stations. A second additional data field 816 designates which mobile stations are receiving the data in the first additional data field 814. The additional data field 812 can be used any of among a user start bit indicator to the at least one of the mobile stations, a resource assignment retransmission for the at least one of the mobile stations, a control signaling indicating group membership change for the at least one of the mobile stations, a data packet format start indication, a data packet format inclusion indicator, a retransmission including indicator, a new data indicator, modulation coding scheme of a packet, a data packet format start indication, a data packet format inclusion indicator, a retransmission inclusion indicator, a repacking bit, and an indicator as to the inclusion of a subsequent optional field within the resource bit field.

Figure 9:
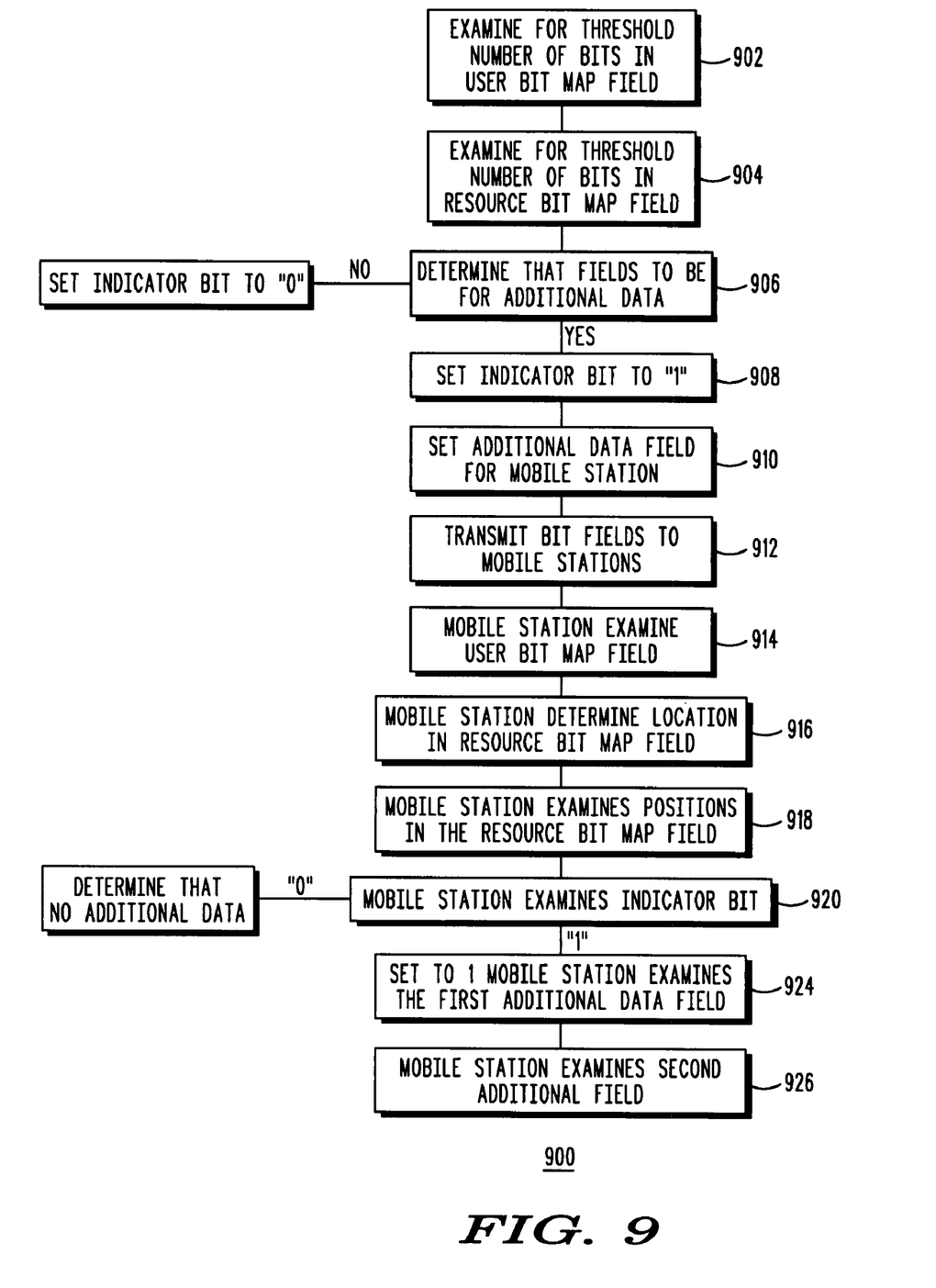
FIG. 9 is a flow chart showing operations of an embodiment of the present invention.

As described, the invention shown in FIG. 8 takes advantage of the tendency of having unused bits in the resource bit map 804 and reassigning those bits to other purposes. FIG. 9 is a flow chart of the operation 900 of using the user and resource bit map fields. The user bit map 802 is examined 902 to determine if a threshold number of bits at the end of the user bit map 802 are designated as "0" or are free. The resource bit map 804 is also examined 904 to determine if a threshold number of bits at the end of the resource bit map 804 are designated as "0" or are free. If the threshold number of bits in both the user bit map 802 and the resource bit map 804 are zero, it is determined 906 that bit maps 800 can be used as for purposes other than those intended because they are not be used for the purposes of first HARQ transmission designations as described above. Note that one of the thresholds can be zero. The threshold values can be sent on a control channel or can be determined from an equation based on the size of the user bit map 802 and resource bit map 804. In this case, the equation could be stored in the memory of the mobile station. If alternative data can be sent, the indicator bit 808 is set 908 to "1" and the first additional data field 814 is provided with data other than first HARQ transmission designations such as resource assignment status for example. In an embodiment, the second additional data field 816 is set 910 to designate the mobile station or stations that will be receiving the resource assignment status in first additional data field 814.

The bit fields 800 are transmitted 912 to the mobile stations. Upon receipt, the mobile station examines 914 its assigned bit position in the user bit map field 802 to determine if a first HARQ transmission is being sent in the resource bit map field 804. If such an assignment is being made, the mobile station determines 916 which location within the resource bit map field 804 the transmission is being sent as described above and examines 918 that position in the resource bit map field. The mobile station also examines 920 indicator bit 808 to determine if additional data is being sent in a portion of the resource bit map 804. If the indicator bit 808 is set to "0", then it is determined 922 that the resource bit map 804 has no additional data for the mobile station. If the indicator bit 808 is set to "1", any mobile station with a user bit map position assignment with 806 knows that the base station is not using its user bit map position to allocate any resources at this time. Further, the mobile station proceeds to examine 924 the first additional data field 814 of the resource bit map field. In an embodiment of the invention, the mobile station also examines 926 the second additional data field 816 to determine if the first additional data field 814 is intended for that mobile station. For clarification, the mobile station can examine the indicator bit 808 in step 920 even if there user bit map does not indicate that the resource bit map contains a transmission for that mobile station or that that the resource bit map has already been assigned to the mobile station and it continues to examine the assigned position in the bit map 804.

Figure 10:
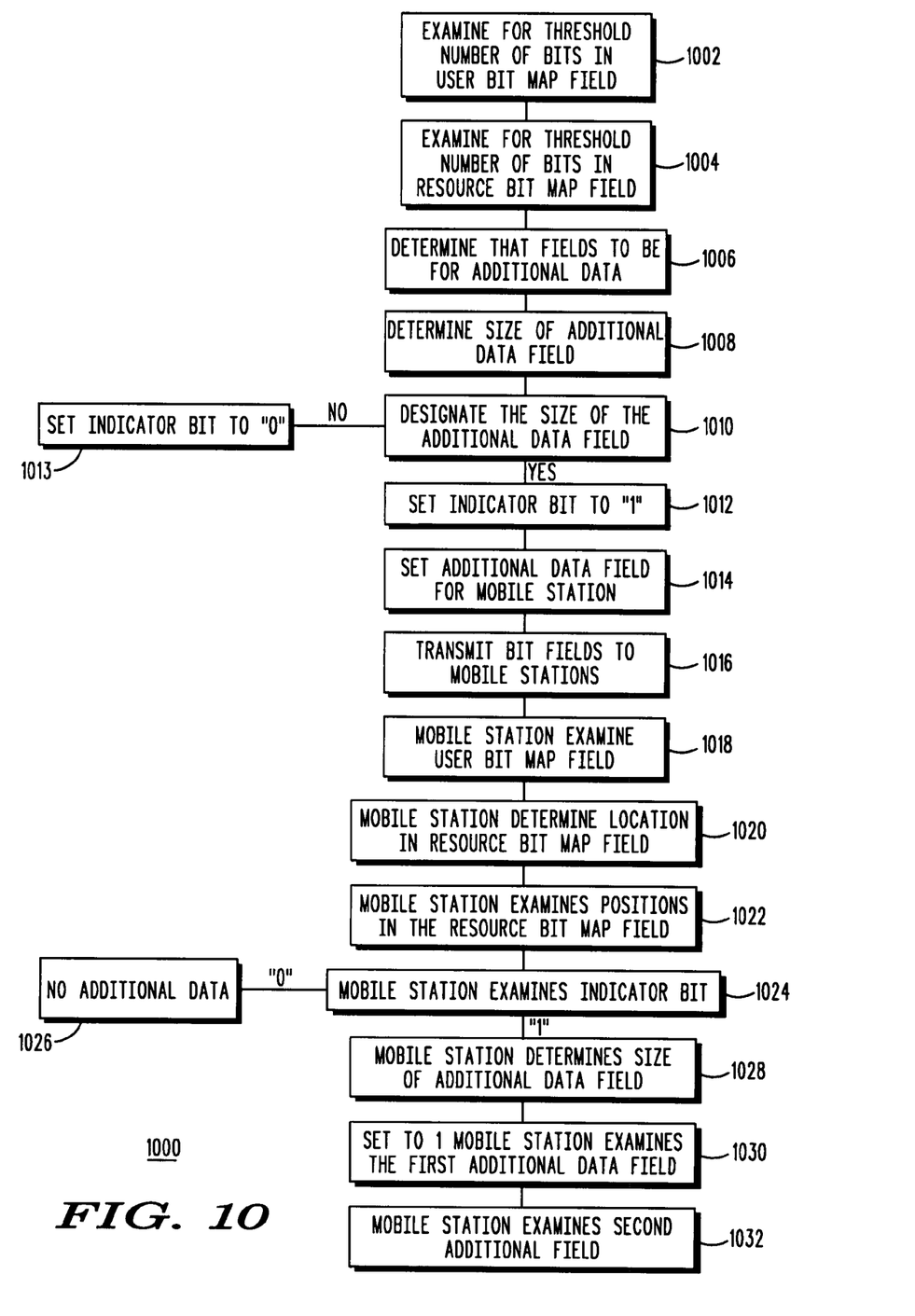
FIG. 10 is a flow chart showing operations of another embodiment of the present invention.

FIG. 10 is a flow chart of the operation 1000 of using the bit map fields 800 in another embodiment of the present invention. The user bit map 802 is examined 1002 to determine if a threshold number of bits at the end of the user bit map 802 are designated as "0". The resource bit map 804 is also examined 1004 to determine if a threshold number of bits at the end of the resource bit map 804 are designated as "0". If the threshold number of bits in both the user bit map 802 and the resource bit map 804 are zero, it is determined 1006 that bit maps 800 can be used as for purposes other than those intended because they are not be used for the purposes of first HARQ transmission designations as described above. Note that one of the thresholds may be zero. Based upon the determination of the threshold number of zeros, the size of the additional data field 812 is determined 1008 and that value is designated 1010 in data field 810. If alternative data can be sent, the indicator bit 808 is set 1012 to "1" and the first additional data field 814 is provided with data other than first HARQ transmission designations such as resource assignment status for example. If alternative data cannot be sent, the indicator bit 808 is set 1013 to "0". In an embodiment, the second additional data field 816 is set 1014 to designate the mobile station or stations that will be receiving the resource assignment status in first additional data field 814.

The bit fields 800 are transmitted 1016 to the mobile stations. Upon receipt, the mobile station examines 1018 its assigned bit position in the user bit map field 802 to determine if a first HARQ transmission is being sent in the resource bit map field 804. If such an assignment is being made, the mobile station determines 1020 which location within the resource bit map field 804 the transmission is being sent as described above and examines 1022 that position in the resource bit map field. The mobile station also examines 1024 indicator bit 808 to determine if additional data is being sent in a portion of the resource bit map 804. If the indicator bit 808 is set to "0", then it is determined 1026 that the resource bit map 804 has no additional data for the mobile station. If the indicator bit 808 is set to "1", the mobile station proceeds to examine 1028 the data field 810 to determine the size of the additional data fields 812 in the resource bit map 804. With this information, the mobile station examines 1030 the first additional data field 814 of the resource bit map field. In an embodiment of the invention, the mobile station also examines 1032 the second additional data field 816 to determine if the first additional data field 814 is intended for that mobile station. The mobile station can then use the additional data for its intended use.

As described, when the indicator bit 808 is set to 1 the additional data fields 812 can be used for a specific mobile station for resource assignments to that user. In addition, the information contained in the additional data fields 812 can be for forward link or reverse link communications between the base stations 103 and the mobile stations 101. As is understood, the indicator bit 808 can change between "0" and "1" depending on the content of the user bit map 802 and the resource bit map 804 such that in one frame the additional data fields 812 in the resource bit map are used for additional data while in the next frame the additional data fields do not contain such additional data but are used for first HARQ transmissions. Thus, the present invention provides for dynamic partitioning of the user bit field 802 and the resource bit field 804 with the redefinition of unassigned bits to help deliver HARQ repeats to mobile stations.

As described, the additional data field 812 in the resource bit map field 804 can be used for a number of different purposes including as user start bit indicator to a specific mobile station 101. In this scenario, the additional data field has start bit data that is being retransmitted to the mobile station that is designated by the indicator and by the second field 816. In another embodiment, the additional data field 812 is used for resource assignment for the specific user with which the field 812 is associated. Control signaling can also be contained in the field 812 such that membership changes are indicated to various mobile stations. A data packet format can be designated to mobile stations as well as data packet format for start indication and format inclusion. A repacking bit and an indicator of the inclusion of subsequent optional fields can be designated by the indicator. Other uses can be developed where each of these uses of the field 812 would otherwise have to transmit to the mobile station in some other field thereby increasing overhead. The usage of the ends of the user bit map field 802 and the resource bit map field 804 reduces overhead by taking unused portions of the fields and utilizing them in ways that otherwise require messages that use resources and overhead.

As explained above, the indicator bit 808 can be redefined between "0" and "1" such that each frame can be designated as having additional data fields 812. The criteria can be based on the need for first HARQ transmissions in the resource bit map field 804 such that both the user bit map field and the resource bit map field are heavily or more loaded. In other words, the indicator bit can revert back to "0" and to using message format when it is loaded enough to require a next larger message but not so loaded that the last user bit is sufficiently likely to be needed. The causes for the indicator bit 808 to be more likely to be "0" include assigning voice calls to the last threshold number of positions in the user bit map field 802. In another scenario, indicator bit 808 remains a "0" when voice call must be assigned to the last threshold number of bits in the field 802. Another situation is when a packing scheme is used where the rightmost bit position swaps user bit position with the left most bit position.

In the resource bit map field, the additional data fields 802 are more likely to be "0" and therefore available for uses described when the work RF conditions users are assigned the bit positions at the beginning of the resource bit map field 804. This is also possible when a predetermined rotation pattern to change resources corresponds to given resource bit positions. As with the user bit map field, a packing scheme is used where the rightmost bit position swaps user bit position with the left most bit position.

The present invention is useful in OFDM because both voice and data is sent using the data fields. Voice requirements are less then data requires. Thus, in an embodiment, the indicator bit can be forced to designate the use of an additional data field 812 when the amount of resource available for data users is greater than some threshold relative to the voice users and the data traffic is ready to begin transmission or all previous HARQ processes are complete. Alternatively, the number of pending start bit resources is less then a threshold so that there are available bits in the resource data bit field. In yet another embodiment, mobile stations are assigned to predefined bit positions when the mobile stations are one of possessing a low voice activity and possessing better channel quality index.

The indicator bit 808 designates that the additional data field 812 is being used by a mobile station. The mobile station can be designated in additional data field 816. The mobile station designated can be a predefined user in a group with conditions among the worst in that group or where voice activity is among the highest in the group. In addition, the mobile station may be indicated by a index designated the worst users in the subgroup of the group to which the additional data field 812 is being transmitted. The mobile station can be either associated with the immediately previous control group message or associated with the opposite direction control group message. In an embodiment, the fields in the user bit map 802 are separated into two fields such as not interrupting field, e.g. speaking or listening or mutual silence, or interrupting, e.g. speaking and listening simultaneously.

In an embodiment, for mobile stations 101 that are farther from the base station 103, the additional fields can be used to convey retransmission information. Those mobile stations close the base station 103 may however use the additional fields 814 to convey data packet format information.

The present invention provides a capacity benefit for the users of the communication network 100. Simulations indicate a more efficient bit map approach which reduces control channel overhead, message size and capacity impact therefore improving VoIP capacity. In addition the present invention may decrease the RF impact of the control messages thereby providing system capacity improvements such as in message size.

It is understood that the indicator bit being set to "1" indicates that the portion of user bit map field and the resource bit map field were not being used for initiating assignment of users to resources corresponding to bit positions in a resource bit map field and for indicating which resources are assigned to mobile stations, respectively before being assign for the other purposes. In addition, the indicator bit being set to "1" indicator bit further indicates that a mobile station is being allocated resources that are not indicated as being used in the resource bit map field including those resource in said portion of resource bit map field.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
    sending a user bit map field from a base station to a plurality of mobile stations wherein the bit map field for initiating assignment of users to resources corresponding to bit positions in a resource bit map field, and
    sending the resource bit map field from the base station to the plurality of mobile stations wherein the resource bit map field is a message indicating which resources are assigned to mobile stations, and
    sending an indicator bit from the base station to the plurality of mobile stations wherein the indicator bit indicates at least one of a portion of the user bit map field is being used for purposes other than initiating assignment of users to resources corresponding to bit positions in a resource bit map field and a portion of the resource bit map field is being used for purposes other than indicating which resources are assigned to mobile stations when at least one of among a user start bit indicator to the at least one of the mobile stations, a resource assignment retransmission for the at least one of the mobile stations, a control signaling indicating group membership change for the at least one of the mobile stations, a data packet format start indication, a data packet format inclusion indicator, a retransmission including indicator, a new data indicator, modulation coding scheme of a packet, a data packet format start indication, a data packet format inclusion indicator, a retransmission inclusion indicator, a repacking bit, and an indicator as to the inclusion of a subsequent optional field within the resource bit field.

2. The method of claim 1, wherein the indicator bit further indicates that at least one of the portion of user bit map field and the resource bit map field are not being used for initiating assignment of users to resources corresponding to bit positions in a resource bit map field and for indicating which resources are assigned to mobile stations, respectively, before being used for purposes other than initiating and indicating, respectively.

3. The method of claim 1 wherein the user bit map field further includes a data field indicating a size of the resource bit field being used for additional data for the at least one of the mobile stations.

4. The method of claim 1 wherein the indicator bit further indicates that a mobile station is being allocated resources that are not indicated as being used in the resource bit map field including those resource in said portion of resource bit map field.

5. The method of claim 1 wherein the indicator bit indicates that one of the portion of the user bit map field and the resource bit map field being used for other purposes when one of the following occurs:
    a first threshold number of users corresponding to predetermined user bitmap bit positions in the user bit map field are not starting and
    a second threshold number of user bit map field positions are zero then a first threshold number of bitmap bit positions in the resource bit map field are free.

6. The method of claim 1 wherein the indicator bit indicates that one of the portion of the user bit map field and the resource bit map field being used for other purposes when a second threshold number of resources corresponding to resource bit positions in the resource bit field are free.

7. The method of claim 1 wherein the indicator bit being defined to be a user bit position when the user bit map field is loaded enough to require a larger message.

8. The method of claim 1 wherein the indicator bit indicates that one of the portion of the user bit map field and the resource bit map field not being used for other purposes when no other bit positions are available for assigning voice calls or when the indicator bit is used in a packing scheme where the indicator bit swaps bit position with another bit in the user bit map.

9. The method of claim 1 further comprising assigning mobile stations to predefined bit positions when the mobile stations are one of possessing a low voice activity and possessing better channel quality index.

10. The method of claim 1 where in the additional data being sent to one of a mobile station associated with a immediately previous control group message to a different control group, an opposite direction control group message, and if the previous control group message to the same control group.

11. The method of claim 1 wherein the user bit field having at least two fields including a not interrupting field and an interrupting field.

12. A bit map scheme to be sent to a mobile station operating in a radio access network comprising
    a user bit map field for initiating assignment of users of mobile stations to resources corresponding to bit positions in a resource bit map field and
    a resource bit map field wherein the resource bit map field is a message indicating which resources are assigned to mobile stations,
    wherein the user bit map field comprising at least one bit to indicate that at least one bit of a bit map field instead includes additional data for at least one mobile station and wherein the additional data being at least one of among a user start bit indicator to the at least one of the mobile stations, a resource assignment retransmission for the at least one of the mobile stations, a control signaling indicating group membership change for the at least one of the mobile stations, a data packet format start indication, a data packet format inclusion indicator, a retransmission including indicator, a new data indicator, modulation coding scheme of a packet, a data packet format start indication, a data packet format inclusion indicator, a retransmission inclusion indicator, a repacking bit, and an indicator as to the inclusion of a subsequent optional field within the resource bit field.

13. The bit map scheme of claim 12 where in the bit map scheme being for an orthogonal frequency division multiple access system.

14. The bit map scheme of claim 12 wherein the indicator is instead used as a user bit position when the user bit field is heavily loaded.

15. The bit map scheme of claim 12 wherein a first threshold number of users corresponding to bits in the user bit field are not starting.

16. The bit map scheme of claim 12 wherein a second threshold number of resources corresponding to bits in the resource bit field are free.

17. The bit map scheme of claim 12 wherein the user bit map field further comprises a number of bits to indicate the at least one mobile station to use the additional data in the resource bit field.

* * * * *